US012786641B2

(12) United States Patent
Davis et al.

(10) Patent No.: US 12,786,641 B2
(45) Date of Patent: Nov. 3, 2026

(54) AUDIO TRANSMITTER

(71) Applicant: Nuheara IP Pty Ltd, Northbridge (AU)

(72) Inventors: Alan Davis, Riverton (AU); Erik Östlin, Hamilton Hill (AU); Peter Combes, Floreat (AU)

(73) Assignee: NUHEARA IP PTY LTD (AU)

( * ) Notice: Subject to any disclaimer, the term of this patent is extended or adjusted under 35 U.S.C. 154(b) by 122 days.

(21) Appl. No.: 18/390,226

(22) Filed: Dec. 20, 2023

(65) Prior Publication Data

US 2024/0223972 A1 Jul. 4, 2024

(30) Foreign Application Priority Data

Jan. 3, 2023 (AU) ................................ 2023900004

(51) Int. Cl.
*H04R 25/00* (2006.01)

(52) U.S. Cl.
CPC ........... *H04R 25/554* (2013.01); *H04R 25/30* (2013.01)

(58) Field of Classification Search
CPC .............................. H04R 25/554; H04R 25/30
USPC .......................................................... 381/315
See application file for complete search history.

(56) References Cited

U.S. PATENT DOCUMENTS 11,172,101 B1 * 11/2021 Boozer .................. H04N 23/51
11,276,384 B2 * 3/2022 Woodruff ............. H04R 1/1083
2015/0124976 A1 * 5/2015 Pedersen .............. H04R 25/552 381/23.1
2017/0094396 A1 3/2017 Chandramohan et al.
2018/0091887 A1 3/2018 Minoo et al.
2018/0310099 A1 10/2018 Andrea
2019/0268705 A1 * 8/2019 Solum .................. A61B 5/0022
2020/0380945 A1 * 12/2020 Woodruff ............. G10K 11/178
2020/0404423 A1 12/2020 Dusan et al.
2021/0314692 A1 * 10/2021 Campbell ............... H02J 50/10
2022/0046365 A1 * 2/2022 Best ........................ H04R 25/50
2022/0140628 A1 * 5/2022 Perri ................... H02J 7/00034 381/315
2023/0274752 A1 * 8/2023 Cheung ............... G10L 21/0208 381/98
2023/0385016 A1 * 11/2023 Kitago .................... G06F 3/165

OTHER PUBLICATIONS

International Search Report for Corresponding Australian Patent Application No. 2023900004, dated Jan. 3, 2023.

* cited by examiner

*Primary Examiner* — David L Ton
(74) *Attorney, Agent, or Firm* — Andrus Intellectual Property Law, LLP

(57) ABSTRACT

An audio transmitter is disclosed that comprises at least one microphone configured to receive ambient audio and produce an ambient audio signal indicative of the received ambient audio, a pairing component arranged to facilitate pairing of the audio transmitter with a wireless audio reproducing device, and an audio transmission component arranged to wirelessly transmit a short-range audio signal to a paired wireless audio reproducing device. The short-range audio signal is usable by the wireless audio reproducing device to reproduce audio representative of the received ambient audio.

20 Claims, 2 Drawing Sheets

AUDIO TRANSMITTER

CROSS REFERENCE TO RELATED APPLICATIONS

The present application claims priority to Australian Patent Application No. 2023900004, filed Jan. 3, 2023, which application is hereby incorporated herein by reference in entirety.

FIELD

The present invention relates to an audio transmitter for use with a personal audio reproducing device such as a set of audio reproducing earbuds.

BACKGROUND

It is known that for some people with hearing impairment, it can be difficult to clearly hear sounds, in particular speech, particularly if the hearing-impaired person is not able to move to a location directly adjacent the person speaking or directly adjacent the device from which the sounds are being produced.

SUMMARY

In accordance with a first aspect of the present invention, there is provided an audio transmitter comprising: at least one microphone configured to receive ambient audio and produce an ambient audio signal indicative of the received ambient audio; a pairing component arranged to facilitate pairing of the audio transmitter with a wireless audio reproducing device; and an audio transmission component arranged to wirelessly transmit a short-range audio signal to a paired wireless audio reproducing device, the short-range audio signal usable by the wireless audio reproducing device to reproduce audio representative of the received ambient audio.

In an embodiment, the audio transmitter comprises a noise reduction component arranged to process the ambient audio signal to increase the signal to noise ratio (SNR) of the ambient audio signal and produce a noise processed audio signal, the audio transmission component arranged to use the noise processed audio signal to produce the short-range audio signal.

In an embodiment, the noise reducing component is arranged to use beam forming to reduce noise in the received ambient audio signal.

In an embodiment, the audio transmitter includes at least 2 microphones.

In an embodiment, the audio transmitter is arranged to use the at least 2 microphones for directional processing, such as beamforming.

In an embodiment, the at least 2 microphones are matched such that they have substantially similar frequency and phase response characteristics.

Preferably, each microphone has a signal to noise ratio (SNR) above about 65 dB, and optionally above about 70 dB In an embodiment, the short-range audio signal is transmitted using at least one Bluetooth protocol.

In an embodiment, the audio transmitter comprises a charging device arranged to charge the wireless audio reproducing device. The audio transmitter may be in the form of a case arranged to contain the audio reproducing device, the audio transmitter arranged to charge the audio reproducing device when the audio reproducing device is received in the case.

In an embodiment, the audio transmitter includes at least one electrical contact for providing an electrical connection with the audio reproducing device when the audio reproducing device is received in the case. The electrical connection can be used to communicate between the audio transmitter and the audio reproducing device when the audio reproducing device is in the case.

In an embodiment, the audio transmitter is arranged to charge the audio reproducing device when an electrical connection is made between the case and the audio reproducing device.

In an alternate arrangement, the audio transmitter is arranged to wirelessly charge the audio reproducing device when the audio reproducing device is received in the case.

In an embodiment, the pairing component is arranged to pair the audio transmitter with an audio reproducing device when the audio reproducing device is received in the case. The pairing component may be arranged to pair with the audio transmitter in response to detection of the audio reproducing device, for example using a proximity sensor that may include a hall effect sensor responsive to a magnet, using at least one electrical contact, or using an infra-red sensor.

In an embodiment, the audio reproducing device is a set of ear buds.

In an embodiment, the audio transmitter comprises a hearing assistance component arranged to process the ambient audio signal so as to augment at least one frequency, for example based on a hearing assistance profile associated with a user. The hearing assistance profile may be obtained from the ear buds.

In an embodiment, the latency of transmission of the short-range audio signals is less than about 20 ms.

BRIEF DESCRIPTION OF THE DRAWINGS

The present invention will now be described, by way of example only, with reference to the accompanying drawings, in which.

DETAILED DESCRIPTION OF THE DRAWINGS

Figure 1:
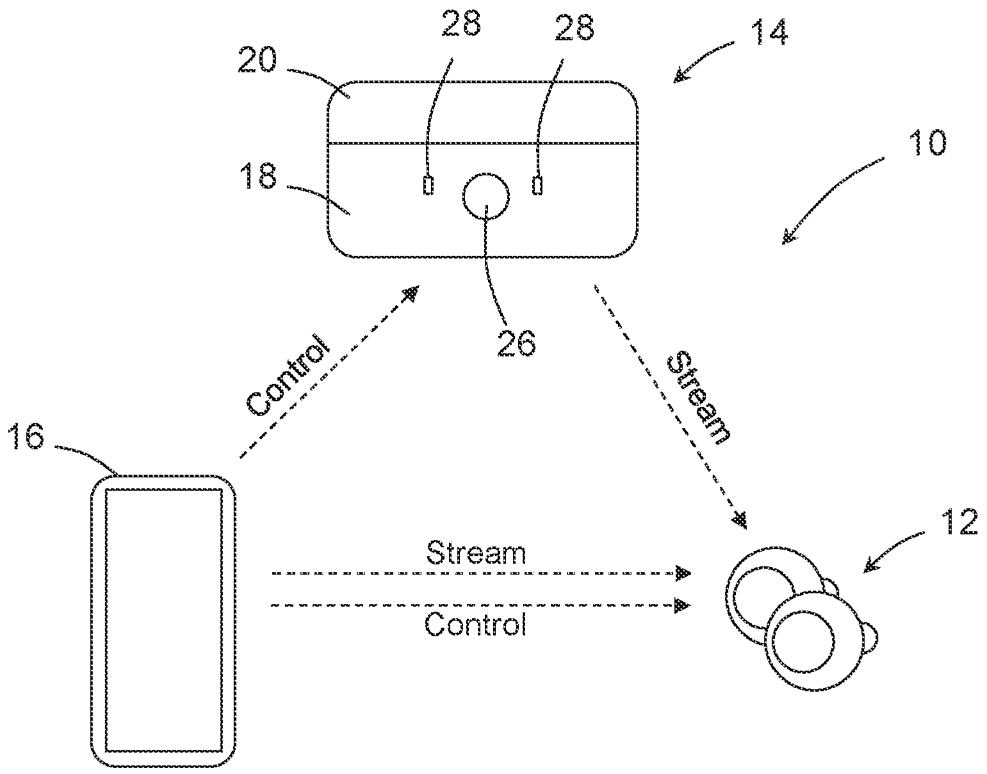
FIG. 1 is a diagrammatic representation of an audio transmitting system in accordance with an embodiment of the present invention.

Referring to FIG. 1 of the drawings, there is shown a representation of an embodiment of an audio transmitting system 10.

In the present example, the system 10 includes at least one personal audio reproducing device, in this example a pair of ear buds 12, and an audio transmitter 14 arranged to generate ambient audio signals representative of ambient audio present adjacent the audio transmitter and to transmit short-range audio signals from the audio transmitter 14 to the ear buds 12.

In this way, the audio transmitter 14 performs an audio relaying function wherein audio from an audio source present adjacent the audio transmitter, for example associated with a person speaking, is relayed to the ear buds 12 and the user of the ear buds is provided with sound that has a higher signal to noise ratio (SNR) compared to sound that would be received if the user was not wearing the ear buds 12.

While in this example the personal audio reproducing device 12 is a pair of ear buds for use in left and right ears of a user, it will be understood that any suitable wireless personal audio reproducing device is envisaged, such as wireless in ear or over ear headphones.

In this example, the ear buds 12 are of a type that include hearing assistance functionality wherein the ear buds are configurable by the user to enhance defined frequencies or frequency bands. The ear buds 12 in this example are connectable to a computing device 16, in this example a smartphone, for example by establishing Bluetooth pairing between the ear buds and the computing device 16, and the ear buds are controllable using a software application, for example such that audio streamed to the ear buds is controllable using the software application.

In this example, the computing device 16 used to control transmission of audio to the ear buds 12 is a portable computing device equipped with suitable communication capabilities, in this example short-range wireless communication using Bluetooth protocols, including Bluetooth Classic and Bluetooth Low Energy (BLE) protocols, such as a smartphone, although it will be understood that any suitable computing device 16 capable of short-range wireless communication is envisaged.

As shown in FIG. 1, in this example the ear buds 12 are capable of receiving wirelessly streamed audio from the audio transmitter 14 or from the smartphone 16, in this example by controlling selection of an audio stream using the smartphone 16.

Figure 2:
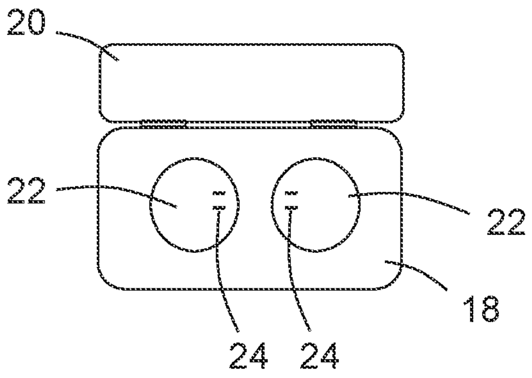
FIG. 2 is a diagrammatic top view of an audio transmitter of the system shown in FIG. 1, with a lid of the audio transmitter shown in an open position.

Referring to FIGS. 1 and 2, in the present embodiment the audio transmitter 14 is in the form of a case for the ear buds 12, in this example a charging case for the ear buds 12. As such, the case 14 includes a receptacle portion 18 and a lid 20 that in this example is pivotably connected to the receptacle portion 18 using at least one hinge. The receptacle portion 18 includes 2 receptacles 22, each of which is shaped to receive an ear bud 12, and each of which includes electrical contacts 24 usable to transfer electrical power to the ear buds 12, and in this example to communicate with the ear buds 12 for example for pairing, configuration, maintenance and/or monitoring purposes.

The audio transmitter 14 also includes a button 26, in this example usable to activate/deactivate the audio transmitter 14 and thereby transmission of ambient audio received adjacent the audio transmitter 14 to the ear buds 12 during use. The button 26 may be mechanically or capacitively operated. The audio transmitter 14 also includes at least one microphone 30 mounted behind a respective microphone aperture 28 formed in a wall of the case.

In this example, at least 2 microphones 30 are provided, the microphones 30 used to implement directional audio processing, such as beamforming, to reduce noise.

In the present example, the audio transmitter 14 serves the following purposes: to protect the ear buds 12 when the ear buds 12 are not in use; to charge the ear buds 12; and to wirelessly relay audio present adjacent the audio transmitter 14 to the ear buds 12 using short-range communication during use.

It will be understood that any suitable communication protocols may be used between the smartphone 16 and the ear buds 12 and between the audio transmitter 14 and the ear buds 12. For example, the following profiles may be used: Hands Free Profile (HFP) that implements a connection between a HFP server at the audio transmitter and/or the smartphone 16 and a HFP client at the ear buds 12 according to the Bluetooth Classic framework; Advanced Audio Distribution Profile (A2DP) that defines parameters for Bluetooth Classic audio streaming over a Bluetooth connection in 2 channel stereo. The protocol includes a suitable codec, for example aptX Low Latency codec that is capable of providing end-to-end latency of 32 ms; Bluetooth Low Energy (BLE) that provides a structure for communicating commands from the smartphone 16 to the audio transmitter 14 and the ear buds 12; Bluetooth Classic and/or Bluetooth LE Audio for transmitting audio; and Any other suitable protocol, for example configured to have low delay.

Figure 3:
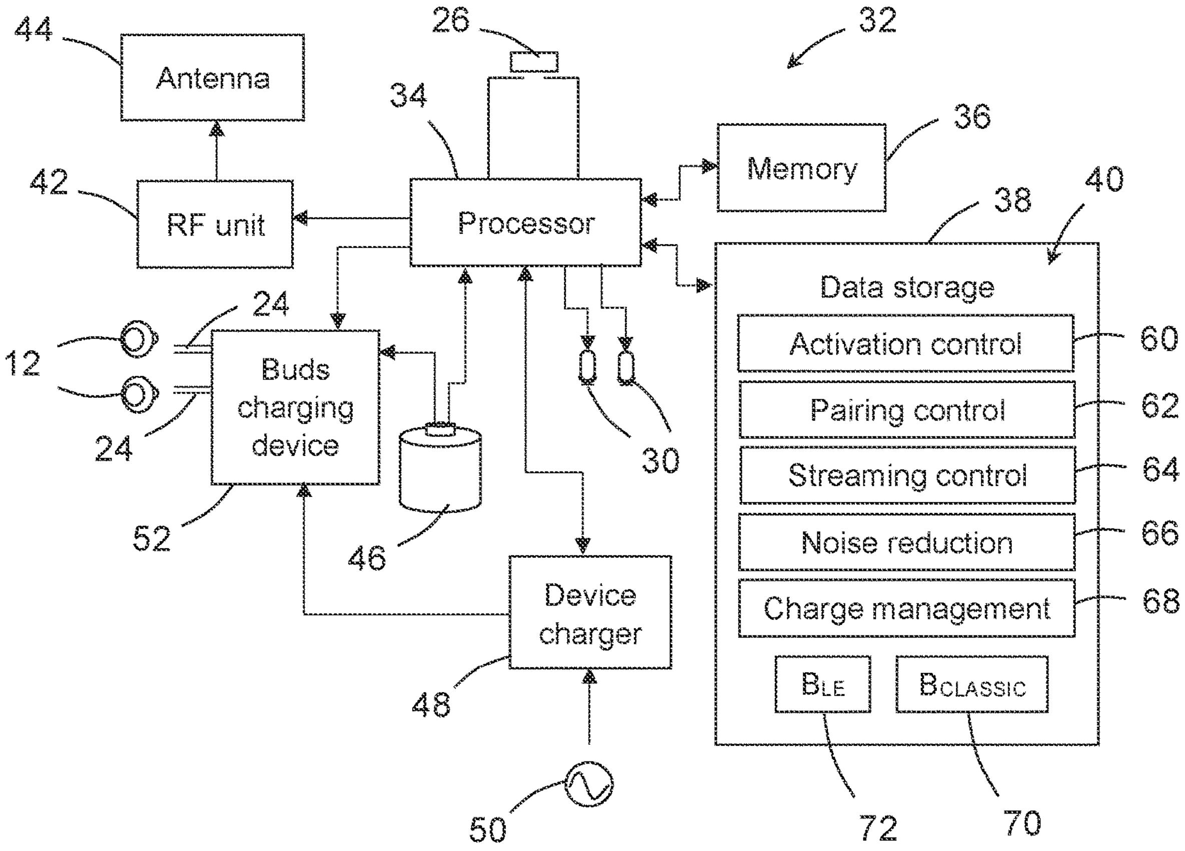
FIG. 3 is a block diagram of components of the audio transmitter according to an embodiment of the present invention.

Referring to FIG. 3, a block diagram of example functional components 32 of the audio transmitter 14 is shown.

In this example, the components 32 include a processor 34 arranged to control and coordinate functions in the audio transmitter 14 and implement processes that carry out desired functionality, and a memory 36 used by the processor 34 to implement programs 40, for example stored in a data storage device 38.

The components 32 also include an RF unit 42 and associated antenna 44 that implement short-range wireless transmission of audio signals received from the processor 34, and a battery 46 in this example is charged using a device charger 48 that receives input electrical power derived from mains electricity 50 and for example supplied using USB protocols, although it will be understood that any suitable arrangement is possible for charging the audio transmitter 14. In this example, the device charger 48 is connectable to and disconnectable from the audio transmitter 14 using any suitable plug/socket arrangement.

The components 32 also include an ear buds charging device 52 arranged to charge ear buds 12 when the ear buds 12 are disposed in the case, in this example using physical electrical connections 24. However, it will be understood that wireless charging techniques may also be used.

In this example, the programs 40 implemented by the processor 34 include the following: an activation control component 60 arranged to control activation of audio processing and transmission of audio from the audio transmitter 14 to the ear buds 12 during use, in this example in response to an activation/deactivation signal received from the button 26; a pairing control component 62 arranged to manage pairing of the audio transmitter 14 with ear buds 12, and subsequent management of one or more sets of paired earbuds 12; a streaming control component 64 arranged to control streaming of audio from the audio transmitter to the ear buds 12, for example in relation to the protocols used, the particular ear buds that will receive the audio, the type of audio processing to be applied to the streamed audio, and so on; a noise reduction component 66 arranged to process the ambient audio signals produced by the microphone(s) 30 in order to reduce noise, for example using beam forming or other noise reducing algorithms; and a charge management component 68 arranged to manage a process of charging ear buds 12 disposed in the case, for example so that electrical charge is received directly from the device charger 48 when the device charger 48 is present, but charge is received from the battery 46 when the device charger 48 is not present.

The charge management component 68 is also arranged to manage charging of the battery 46 using the device charger 48.

Also stored in the data storage device 38 is data indicative of protocols 70, 72 used by the audio transmitter 14 to communicate with the smartphone 16 and the ear buds 12, and stream audio signals from the audio transmitter 14 to the ear buds 12 using short-range communication protocols. For example, the protocol data may include data indicative of Bluetooth Classic, Bluetooth LE, and/or Bluetooth LE Audio protocols.

In this example, in order to pair a set of ear buds 12 with the audio transmitter 14 for the first time, the user places the ear buds 12 into the receptacles 22, which causes an electrical connection to be made between the audio transmitter 14 and the ear buds 12. By providing each set of ear buds 12 with identification data, such as an ID code, a pairing process can be implemented wherein the ear bud ID code is transferred to the audio transmitter 14 so that the ear buds 12 can be subsequently identified for short-range wireless audio transmission and a Bluetooth connection made between the audio transmitter 14 and the ear buds 12.

In this way, the pairing occurs automatically, and the user does not need to take any action. For Bluetooth ear buds, the pairing process is often a frustrating and difficult to process to complete, particularly in circumstances wherein neither the charge case or ear buds have a display or sophisticated user input interface.

The ear buds 12 are also paired with a user's computing device 16, in this example a smartphone, in a conventional way so that the user can control audio streaming from the smartphone 16 to the ear buds 12 using the smartphone 16. The smartphone 16 may also be used to configure and control the ear buds 12, for example so that the ear buds 12 are configured according to the hearing characteristics of the user. The smartphone 16 may also be used to control functionality of the audio transmitter 14, for example so as to manage audio processing implemented by the audio transmitter 14, such as noise reducing functionality, manage paired devices, and so on.

It will be understood that the audio transmitter 14 is of particular use for a hearing-impaired person, for example in circumstances wherein a degree of background noise exists that makes clear hearing difficult for the user, such as in an environment wherein several people are meeting and a person speaking is often not disposed immediately adjacent the user.

With this circumstance as an example, a user places the audio transmitter 14 adjacent a person currently speaking and presses the activation button 26. This causes the processor 34 to commence capturing ambient audio using the microphone(s) 30, generate ambient audio signals representative of the ambient audio, process the ambient audio signals so as to reduce noise, and transmit the processed audio to the ear buds 12 using Bluetooth protocols and the RF unit 42 and antenna 44. In this way, the user wearing the ear buds 12 is provided with audio representative of the ambient audio that has a higher signal to noise ratio (SNR) that would be experienced by the user if the user was not wearing the ear buds 12.

It will be understood that the audio transmitter 14 may be arranged to pair with and transmit audio to multiple sets of ear buds 12.

While with the current arrangement, user-specific hearing assistance may be implemented by the ear buds 12, as an alternative it will be understood that the audio transmitter 14 may include user-specific hearing assistance functionality such that a hearing assistance profile, for example in the form of an audiogram, is stored in the audio transmitter 14 and the ambient audio signals processed so that required frequencies or frequency bands are augmented based on the user's hearing profile. In this way, a user may benefit from hearing assistance even if the user's audio reproducing device does not have hearing assistance functionality.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

Modifications and variations as would be apparent to a skilled addressee are determined to be within the scope of the present invention.

We claim:

1. An audio transmitter configured for wirelessly communicating with a wireless audio reproducing device separate therefrom, the audio transmitter comprising:

at least one microphone configured to receive ambient audio and produce an ambient audio signal indicative of the received ambient audio;

a pairing component arranged to facilitate pairing of the audio transmitter with the wireless audio reproducing device;

an audio transmission component arranged to wirelessly transmit a short-range audio signal to a paired wireless audio reproducing device, the short-range audio signal usable by the wireless audio reproducing device to reproduce audio representative of the received ambient audio; and a hearing assistance component arranged to process the ambient audio signal based on a hearing assistance profile associated with a user so as to augment at least one frequency before transmitting to the paired wireless audio reproducing device.

2. An audio transmitter as claimed in claim 1, comprising a noise reduction component arranged to process the ambient audio signal to increase the signal to noise ratio (SNR) of the ambient audio signal and produce a noise processed audio signal, the audio transmission component arranged to use the noise processed audio signal to produce the short-range audio signal.

3. An audio transmitter as claimed in claim 2, comprising at least 2 microphones.

4. An audio transmitter as claimed in claim 3, wherein the noise reducing component is arranged to use the at least 2 microphones for directional processing to reduce noise in the received ambient audio signal.

5. An audio transmitter as claimed in claim 4, wherein the directional processing includes beam forming.

6. An audio transmitter as claimed in claim 3, wherein the at least 2 microphones are matched such that they have substantially similar frequency and phase response characteristics.

7. An audio transmitter as claimed in claim 1, wherein each microphone has a signal to noise ratio (SNR) above about 65 dB, and optionally above about 70 dB.

8. An audio transmitter as claimed in claim 1, wherein the short-range audio signal is transmitted using at least one Bluetooth protocol.

9. An audio transmitter as claimed in claim 1, comprising a charging device arranged to charge the wireless audio reproducing device.

10. An audio transmitter as claimed in claim 9, wherein the audio transmitter comprises a case arranged to contain the audio reproducing device, the audio transmitter arranged to charge the audio reproducing device when the audio reproducing device is received in the case.

11. An audio transmitter as claimed in claim 10, wherein the audio transmitter includes at least one electrical contact for providing an electrical connection with the audio reproducing device when the audio reproducing device is received in the case.

12. An audio transmitter as claimed in claim 11, wherein the electrical connection is used to communicate between the audio transmitter and the audio reproducing device when the audio reproducing device is in the case.

13. An audio transmitter as claimed in claim 11, wherein the audio transmitter is arranged to charge the audio reproducing device when an electrical connection is made between the case and the audio reproducing device.

14. An audio transmitter as claimed in claim 10, wherein the audio transmitter is arranged to wirelessly charge the audio reproducing device when the audio reproducing device is received in the case.

15. An audio transmitter as claimed in claim 10, wherein the pairing component is arranged to pair the audio transmitter with an audio reproducing device when the audio reproducing device is received in the case.

16. An audio transmitter as claimed in claim 15, wherein the pairing component is arranged to pair with the audio transmitter in response to detection of the audio reproducing device.

17. An audio transmitter as claimed in claim 16, wherein the pairing component is arranged to pair the audio transmitter with an audio reproducing device using a proximity sensor, an infra-red sensor and/or at least one electrical contact.

18. An audio transmitter as claimed in claim 1, wherein the audio reproducing device is a set of ear buds.

19. An audio transmitter as claimed in claim 1, wherein the hearing assistance profile is obtained from the audio reproducing device.

20. An audio transmitter as claimed in claim 1, wherein the latency of transmission of the short-range audio signals is less than about 20 ms.

* * * * *